(12) United States Patent
Verwys et al.

(10) Patent No.: US 10,384,622 B2
(45) Date of Patent: Aug. 20, 2019

(54) ILLUMINATED VEHICLE EMBLEM

(71) Applicant: Honda Motor Co., Ltd., Tokyo (JP)

(72) Inventors: Nichole A. Verwys, Marysville, OH (US); Zachary Segraves, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 214 days.

(21) Appl. No.: 15/639,734

(22) Filed: Jun. 30, 2017

(65) Prior Publication Data
US 2019/0001901 A1 Jan. 3, 2019

(51) Int. Cl.
*B60R 13/00* (2006.01)
*G09F 13/22* (2006.01)
*B60R 21/215* (2011.01)

(52) U.S. Cl.
CPC ............. *B60R 13/005* (2013.01); *G09F 13/22* (2013.01); *B60R 2021/21543* (2013.01); *G09F 2013/227* (2013.01)

(58) Field of Classification Search
CPC ......... B60R 13/005; B60R 2021/21543; G09F 13/22; G09F 2013/227
See application file for complete search history.

(56) References Cited

U.S. PATENT DOCUMENTS

| | | |
|---|---|---|
| 3,185,650 A | 5/1965 | Gurnee et al. |
| 4,663,214 A | 5/1987 | Coburn, Jr. |
| 4,934,753 A | 6/1990 | Gajewski |
| 5,321,069 A | 6/1994 | Owens |
| 5,336,965 A | 8/1994 | Meyer et al. |
| 5,339,550 A | 8/1994 | Hoffman |
| 5,434,013 A | 7/1995 | Fernandez |
| 5,593,782 A | 1/1997 | Budd |
| 6,123,871 A | 9/2000 | Carroll |
| 6,517,226 B1 | 2/2003 | Zimmermann et al. |
| 6,561,667 B2 | 5/2003 | Stapf |
| 6,616,312 B2 | 9/2003 | Carter |

(Continued)

FOREIGN PATENT DOCUMENTS

| | | |
|---|---|---|
| CN | 202071757 U | 12/2011 |
| DE | 10319396 | 11/2004 |

(Continued)

OTHER PUBLICATIONS

Office Action of U.S. Appl. No. 15/639,306 dated Sep. 4, 2018, 19 pages.

(Continued)

*Primary Examiner* — David V Bruce

(74) *Attorney, Agent, or Firm* — Rankin, Hill & Clark LLP

(57) ABSTRACT

An electroluminescent vehicle emblem and a method for illuminating a vehicle emblem includes a base layer, a cover layer, and an electroluminescent light source, which can be one or two electroluminescent assemblies. When the electroluminescent light source is not activated, the cover layer has an opaque appearance. When the electroluminescent light source is activated, light emitted from the electroluminescent light source is transmitted through the cover layer and emitted from a front of the vehicle emblem. Light is also emitted from a back of the vehicle emblem that is opposite from the front of the vehicle emblem to provide back lighting to the vehicle emblem.

20 Claims, 4 Drawing Sheets

(56) References Cited

U.S. PATENT DOCUMENTS

| | | |
|---|---|---|
| 6,641,276 B1 | 11/2003 | Macher et al. |
| 6,673,437 B2 | 1/2004 | Kohla et al. |
| 6,758,510 B1 | 7/2004 | Starling |
| 7,118,239 B2 | 10/2006 | Itoh et al. |
| 7,195,381 B2 | 3/2007 | Lynam et al. |
| 7,210,829 B2 | 5/2007 | Okazaki et al. |
| 7,234,850 B2 | 6/2007 | Garcia et al. |
| 7,237,933 B2 | 6/2007 | Radu et al. |
| 8,016,465 B2 | 9/2011 | Egerer et al. |
| 8,106,578 B2 | 1/2012 | Brown et al. |
| 8,113,695 B2 | 2/2012 | Meinke et al. |
| 8,162,520 B2 | 4/2012 | Penner |
| 8,256,945 B2 | 9/2012 | Choquet |
| 8,333,492 B2 | 12/2012 | Dingman et al. |
| 8,339,252 B2 | 12/2012 | Ozaki |
| 8,345,095 B2 | 1/2013 | Oizumi et al. |
| 8,408,766 B2 | 4/2013 | Wilson et al. |
| 8,456,082 B2 | 6/2013 | Stiles et al. |
| 8,469,562 B2 | 6/2013 | Marzorati et al. |
| 8,470,388 B1 | 6/2013 | Zsinko et al. |
| 9,067,556 B2 * | 6/2015 | Bosch .................. B60R 21/203 |
| 9,315,148 B2 | 4/2016 | Schwenken et al. |
| 2004/0090317 A1 | 5/2004 | Rothkop |
| 2004/0110026 A1 | 6/2004 | Richards et al. |
| 2005/0190570 A1 | 9/2005 | Roessler |
| 2006/0034092 A1 | 2/2006 | Okazaki et al. |
| 2006/0097633 A1 | 5/2006 | Cho et al. |
| 2006/0138948 A1 | 6/2006 | Ray et al. |
| 2009/0129107 A1 | 5/2009 | Egerer et al. |
| 2009/0219468 A1 | 9/2009 | Barton et al. |
| 2009/0251917 A1 | 10/2009 | Wollner et al. |
| 2010/0265731 A1 | 10/2010 | Van Herpen et al. |
| 2010/0283007 A1 | 11/2010 | Robinson |
| 2010/0302020 A1 | 12/2010 | Lenneman et al. |
| 2010/0321946 A1 | 12/2010 | Dingman et al. |
| 2012/0001406 A1 | 1/2012 | Paxton et al. |
| 2014/0376243 A1 | 12/2014 | Schwenke et al. |
| 2015/0165964 A1 | 6/2015 | Mori |
| 2016/0280128 A1 | 9/2016 | Cannon |
| 2016/0288709 A1 | 10/2016 | Nespolo et al. |
| 2017/0246989 A1 | 8/2017 | Ben Abdelaziz |
| 2018/0009393 A1 | 1/2018 | Nagashima |
| 2018/0218611 A1 | 8/2018 | Nagura |

FOREIGN PATENT DOCUMENTS

| | | |
|---|---|---|
| EP | 1053910 | 2/2003 |
| EP | 1188615 | 6/2004 |
| EP | 1625971 | 2/2006 |
| GB | 2495964 | 5/2013 |
| JP | 2006137227 | 6/2006 |
| WO | 2003061351 | 7/2003 |
| WO | 20080169978 | 2/2008 |

OTHER PUBLICATIONS

Office Action of U.S. Appl. No. 15/639,357 dated Aug. 27, 2018, 29 pages.

Internet Website: http://www.wranglerforum.com/f274/interior-paint-job-212857.html; regarding blog entitled "Interior paint job?" by Jakebar777 and Darkfire; printed Jun. 30, 2017.

Internet Website: http://www.autoblog.com/2004/08/04/volvo-invents-blis-blind-spot-info-system-actual-happiness/, auto blog, by Christopher Diken, Aug. 4, 2004.

Internet Website: http://www.dedona.com/blind-spot-monitoring-and-alert-systems/, DeDona Tint & Sound, Nov. 5, 2013.

Office Action of U.S. Appl. No. 15/429,858 dated Jul. 5, 2018, 11 pages.

Office Action of U.S. Appl. No. 15/639,357 dated Jan. 4, 2019, 21 pages.

NOA of U.S. Appl. No. 15/639,306 dated Feb. 21, 2019, 17 pages.

* cited by examiner

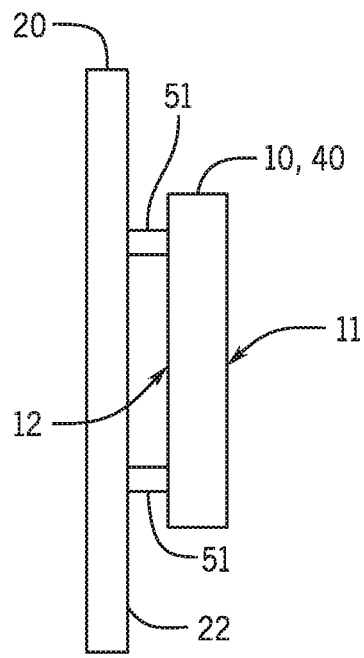
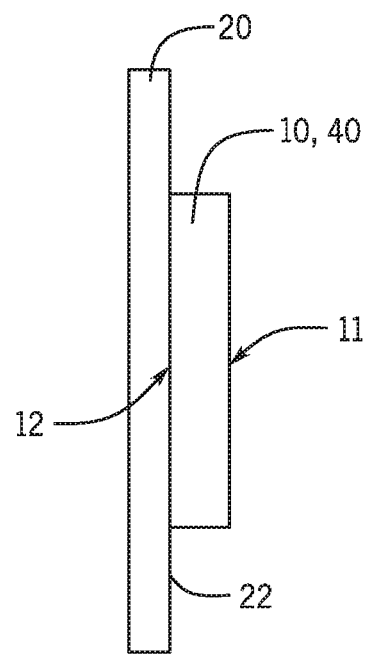
FIG. 5  FIG. 6
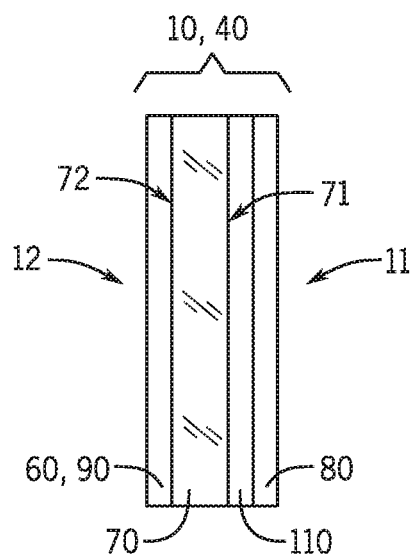
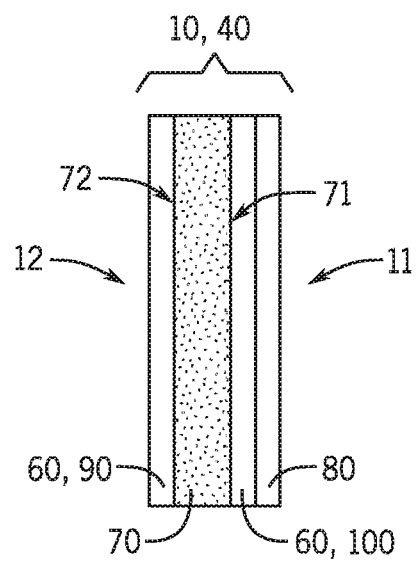
FIG. 7  FIG. 8

US 10,384,622 B2

ILLUMINATED VEHICLE EMBLEM

BACKGROUND

Attempts have been made to provide distinctive emblems for vehicles. One difficulty in providing such emblems is that they are not recognizable or cannot be seen in the dark. Exterior vehicle emblems typically depict a vehicle make or model, and can be used as part of an ornamental design to provide a distinctive aesthetic appearance to a portion of the vehicle. However, exterior vehicle emblems often cannot be seen at night because they are obscured by glare from the vehicle's headlights, which can prevents recognition of the vehicle make or model and detract from the aesthetic function of the emblem. Interior vehicle emblems suffer from the same difficulties, since interior vehicle lighting does not sufficiently illuminate the emblems at night.

SUMMARY

According to one aspect, a vehicle emblem includes a base layer having a first side and a second side that is opposite from the first side, a cover layer disposed over the first side of the base layer, and an electroluminescent light source that emits light when activated. When the electroluminescent light source is not activated, the cover layer has an opaque appearance. When the electroluminescent light source is activated, light emitted from the electroluminescent light source is a) transmitted through the cover layer and emitted from a front of the vehicle emblem, and b) emitted from a back of the vehicle emblem that is opposite from the front of the vehicle emblem.

According to another aspect, a grill assembly of a vehicle includes a grill panel, and an electroluminescent emblem that emits light when activated. The emblem includes a front and an oppositely directed back, and is secured relative to the grill panel such that the back of the emblem is closer to the grill panel than the front of the emblem. When the emblem is not activated, the front of the emblem has an opaque appearance. Upon activation, light is emitted from the front and back of the emblem. Light emitted from the back of the emblem illuminates at least a portion of a front surface of the grill panel.

According to a further aspect, a method of illuminating a vehicle emblem, includes providing a vehicle emblem. The vehicle emblem includes a base layer having a first side and a second side that is opposite from the first side, a cover layer disposed over the first side of the base layer, and an electroluminescent light source that emits light when activated. The electroluminescent light source is disposed on the base layer. The vehicle emblem is mounted on a vehicle, and attached to a power source of the vehicle. The method includes providing power from the power source to the vehicle emblem to activate the vehicle emblem to emit light. When the electroluminescent light source is not activated, the cover layer has an opaque appearance. When the electroluminescent light source is activated, light emitted from the electroluminescent light source is a) transmitted through the cover layer and emitted from a front of the vehicle emblem, and b) emitted from a back of the vehicle emblem that is opposite from the front of the vehicle emblem. Light emitted from the front of the vehicle emblem has different chromaticity coordinates than light emitted from the back of the vehicle emblem.

BRIEF DESCRIPTION OF THE DRAWINGS

FIG. 5 is a schematic side view an electroluminescent emblem according to an exemplary embodiment.

FIG. 6 is a schematic side view of another electroluminescent emblem according to an exemplary embodiment.

FIG. 7 is a schematic cross-sectional view of an electroluminescent emblem according to an exemplary embodiment.

FIG. 8 is a schematic cross-sectional view of another electroluminescent emblem according to an exemplary embodiment.

DETAILED DESCRIPTION

Figure 1:
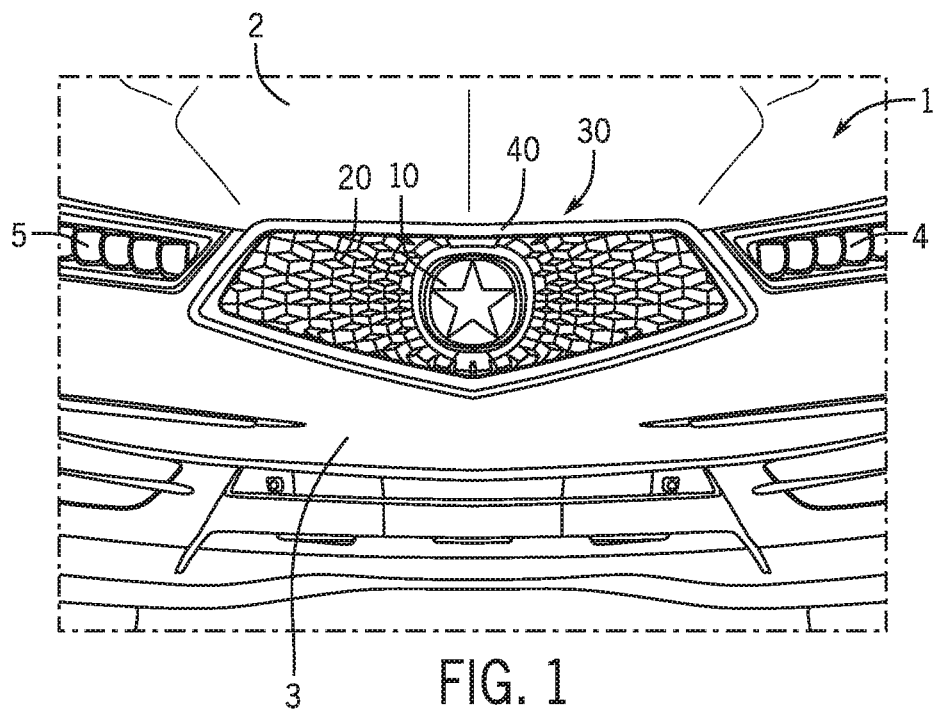
FIG. 1 is a front elevation view of a grill assembly of a vehicle with an electroluminescent emblem according to an exemplary embodiment.
Figure 2:
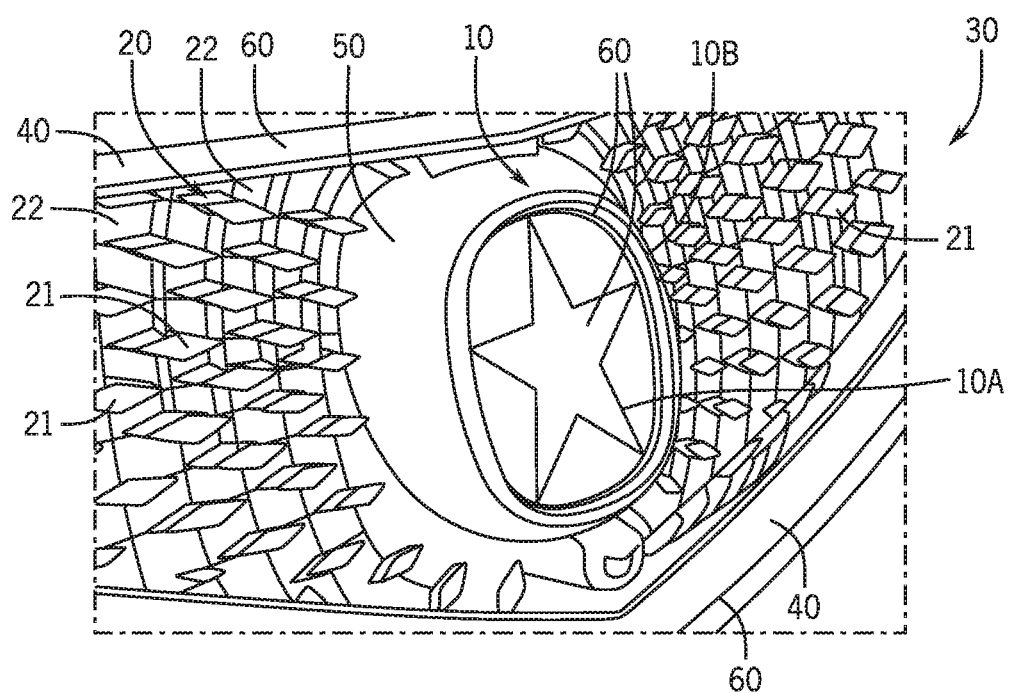
FIG. 2 is a perspective view of the grill assembly of FIG. 1 showing details of the electroluminescent emblem.
Figure 3:
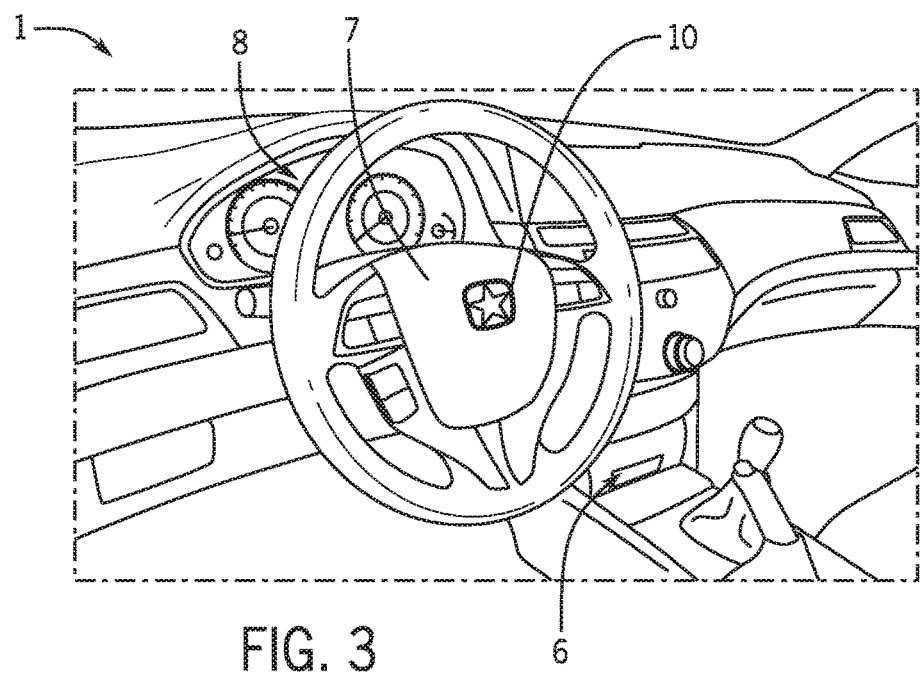
FIG. 3 is a front elevation view of an interior of a vehicle with a steering wheel assembly with an electroluminescent emblem according to an exemplary embodiment.
Figure 4:
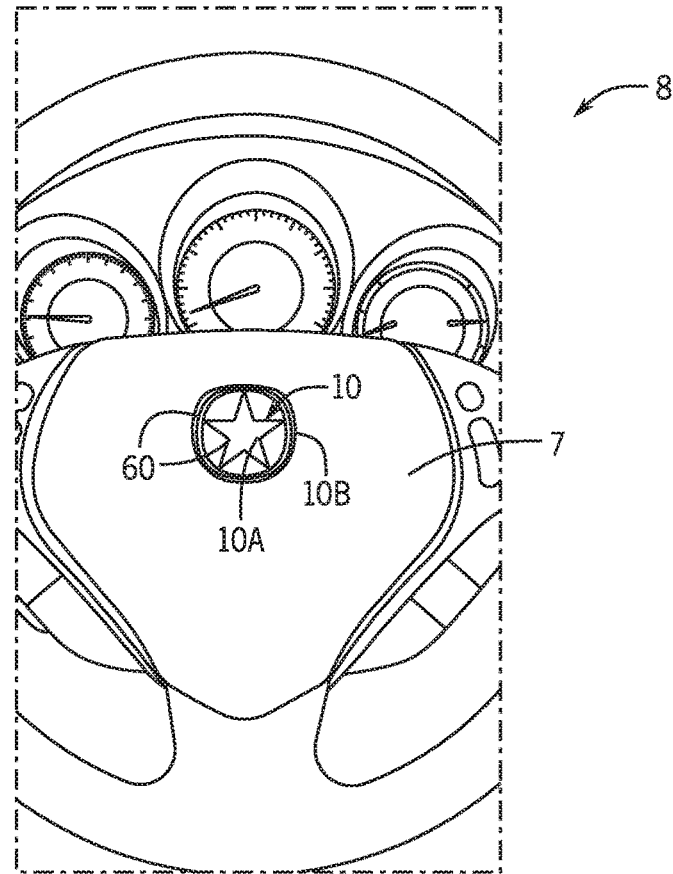
FIG. 4 is a perspective view of the steering wheel assembly of FIG. 3 showing details of the electroluminescent emblem.

Referring now to the figures wherein the showings are for purposes of illustrating one or more embodiments only and not for purposes of limiting the same, FIGS. 1-4 depict a vehicle 1 including an exemplary electroluminescent illuminated vehicle emblem 10. The electroluminescent emblem 10 can provide various illuminated indicia as desired, including for example, an indication of a vehicle make or model. The illumination of the vehicle emblem 10 allows for easier recognition of the vehicle emblem 10 in dark or dim conditions. The emblem 10 may be provided anywhere on the vehicle including for example, at the exterior (FIGS. 1 and 2) or in an interior of the vehicle, such as in the passenger's compartment 6 (FIGS. 3 and 4).

In FIGS. 1 and 2, the emblem 10 is on a front of the vehicle 1, which is depicted to include a front hood 2 covering an engine compartment, a front bumper 3, a driver's side headlight 4 and a passenger's side headlight 5. In FIGS. 3 and 4, the emblem 10 is depicted to be included on an exposed surface 7 of a steering wheel assembly 8 in a passenger's compartment 6 of the vehicle 1.

As depicted in FIGS. 1 and 2, the emblem 10 is provided at the front of the vehicle 1 as part of a grill assembly 30. The grill assembly 30 may include a grill panel 20 and a grill border 40 surrounding the periphery of the panel 20. The panel 20 may be vented to allow air into an engine compartment and may include one or more three-dimensional projections 21 protruding from the front surface 22 of the grill panel 20. As depicted, the projections 21 include an array of diamond-shaped features arranged around the emblem 10. However, the projections 21 can include other shapes and configurations as desired, or the panel 20 may be free of projections.

The emblem 10, and optionally the grill border 40, includes one or more electroluminescent light sources 60 that emit light when activated. Other portions of the grill assembly 30, or components that are adjacent to the grill assembly 30 or emblem 10, may also include one or more electroluminescent light sources 60 that emit light when activated For example, one or more electroluminescent light sources 60 may be included at the front or rear of the grill panel 20, at the front or rear of the housing 50, or at the front or rear of other components not contacting the grill assembly 30 but that will otherwise illuminate the grill assembly 30 or emblem 10. In a non-limiting example and as depicted in FIGS. 1-4, the emblem 10 comprises an inner emblem 10A surrounded by an outer emblem 10B, in order to provide an illuminated circular feature (i.e. outer emblem 10B) around an illuminated vehicle manufacturer's mark (i.e. inner emblem 10A). However, other configurations for the emblem 10 can be used as desired to achieve a particular illuminated effect or design. The electroluminescent light sources 60 are configured such that when activated, light is emitted from a front 11 of the emblem 10 to provide illuminated indicia for the vehicle 1, and light is emitted from a back 12 of the emblem 10 to provide back lighting to the emblem 10 and/or to illuminate a vehicle component that is adjacent to the vehicle emblem 10. As explained in more detail herein, each of the electroluminescent light sources 60 can be defined by one or more electroluminescent assemblies.

As depicted in FIG. 2, the emblem 10 may be included in a housing 50. The housing 50 may space the emblem 10 (and the electroluminescent light source 60) in front of the front surface 22 of the grill panel 20 by a predefined distance, or may space the electroluminescent light sources 60 from another surface, such as a back surface of the housing 50, for example. In another embodiment as depicted in FIG. 5, the emblem 10 or grill border 40 may be spaced from the front surface 22 of the grill panel 20 by one or more legs 51 extending between the emblem 10 or grill border 40 and the grill panel 20 or between the emblem 10 or grill border 40 and another surface. In still another embodiment as depicted in FIG. 6, the emblem 10 or grill border 40 may be mounted such that the emblem 10 or grill border 40 is not spaced from the grill panel 20 or other surface, such as may be the case in FIGS. 3 and 4, wherein the emblem 10 may be mounted directly to the steering wheel assembly 8.

Light emitted from the front 11 of the emblem 10 or grill border 40 provides illuminated indicia that is visible from the front of the vehicle 1 in FIGS. 1 and 2. Light emitted from the front 11 of the emblem 10 provides illuminated indicia that is visible from the passenger's compartment 6 in FIGS. 3 and 4. Light emitted from the back 12 of the emblem 10 or grill border 40 may provide back lighting to the emblem 10, and may also illuminate a vehicle component that is adjacent to the emblem 10 or grill border 40. In FIGS. 1 and 2 for example, the emblem 10 or grill border 40 may illuminate the grill panel 20, including the projections 21 and the front surface 22 of the panel 20. In one aspect, light emitted from the back 12 of the emblem 10 or grill border 40 in FIGS. 1 and 2, accents the three-dimensional contours of the projections 21 to provide a distinctive illuminated appearance to the grill assembly 30. In FIGS. 3 and 4, the emblem 10 may illuminate the exposed surface 7 of the steering wheel assembly 8, to provide a distinctive illuminated appearance to the steering wheel assembly 8.

Light emitted from the back 12 of the emblem 10 or grill border 40 may naturally spread out or diffuse in different directions to provide the backlighting to the emblem and to illuminate a vehicle component that is adjacent to the emblem 10 or grill border 40. In another embodiment, the direction of propagation of light emitted from the back 12 of the emblem 10 or grill border 40 may be purposefully changed or directed, such as by reflection, refraction, diffraction, or a combination thereof. For example, light emitted from the back 12 of the emblem 10 or grill border 40 in FIG. 5, may normally propagate generally perpendicular to a back surface of the emblem 10 or grill border 40 and directly at the front surface 22 of the grill panel 20. However, such propagation direction may be change, altered, or redirected so that light emitted from the back 12 of the emblem 10 or grill border 40 can propagate generally parallel to the back surface of the emblem 10 or grill border 40 and along the front surface 22 of the grill panel 20. This change in the direction of propagation of light emitted from the back 12 of the emblem 10 or grill border 40 may allow more of the projections 21 (FIG. 2) on the front surface 22 of the grill panel 20 to be illuminated. Similar redirection of emitted light can be used for the emblem 10 in FIGS. 3 and 4. Redirecting of emitted light can be accomplished using a material, medium, or apparatus that causes such redirection of light, such as for example, a mirror, internal reflection in a coating layer, fiber optics, etc.

With additional reference to FIGS. 7 and 8, exemplary emblems 10 and grill borders 40 have a front 11, and a back 12 that is oppositely directed from the front 11. The emblems 10 and grill borders 40 include a transparent or opaque base layer 70, a transparent cover layer 80, and at least one electroluminescent light source 60 that emits light when activated. The electroluminescent light source 60 includes at least one electroluminescent assembly, which may be disposed on the base layer 70, optionally directly on the base layer 70. As depicted, the emblem 10 or grill border 40 in FIG. 7 includes an electroluminescent light source 60 comprising a back electroluminescent assembly 90 disposed at the back 12 of the emblem 10 or grill border 40 and at the second side 72 of the base layer 70. The emblem 10 or grill border 40 also includes a transparent color modifying layer 110 between the base layer 70 and cover layer 80. As depicted in FIG. 8, the emblem 10 or grill border 40 includes an electroluminescent light source 60 comprising a back electroluminescent assembly 90 at the back 12 of the emblem 10 or grill border 40 and at the second side 72 of the base layer 70, and a front electroluminescent assembly 100 at the front 11 of the emblem 10 or grill border 40 and at the first side 71 of the base layer 70.

The base layer 70 includes a first side 71 directed towards the front 11 of the emblem 10 or grill border 40, and a second side 72 that is oppositely directed from the first side 71 and directed towards the back 12 of the emblem 10 or grill border 40. With respect to the embodiment in FIGS. 1 and 2, the first side 71 of the base layer 70 is directed away from the front surface 22 of the grill panel 20 and the second side is directed towards the grill panel 20. With respect to the embodiment in FIGS. 3 and 4, the first side 71 of the base layer 70 is directed away from the exposed surface 7 of the steering wheel assembly 8 and towards occupants in the passenger's compartment 6 of the vehicle 1. The base layer 70 can include for example, polycarbonate, and can be transparent or opaque. As used herein, "transparent" refers to a material that is not opaque, and which allows at least some light to be transmitted therethrough, and includes transparent and translucent materials that can be colored or colorless.

In one embodiment as depicted in FIG. 7, the back electroluminescent assembly 90 provides two-way illumination, wherein light is emitted from the two major surfaces of the back electroluminescent assembly 90, and wherein the back electroluminescent assembly 90 emits light towards the front 11 and back 12 of the emblem 10 or grill border 40.

The base layer 70 may be transparent, such as comprising transparent polycarbonate. As such, even though the emblem 10 or grill border 40 only includes the back electroluminescent assembly 90 at the second side 72 of the base layer 70, light can still be emitting from both the back 12 and the front 11 of the emblem 10 or grill border 40, since light emitted from the back electroluminescent assembly 90 can be transmitted through the transparent base layer 70, through the transparent color modifying layer 110, through the transparent cover layer 80, and emitted from the front 11 of the emblem 10 or grill border 40.

In another embodiment, such as depicted in FIG. 8, the base layer 70 may be opaque. In this embodiment, the back electroluminescent assembly 90 and the front electroluminescent assembly 100 provide one-way illumination, wherein they each emit light only towards the respective front 11 and back 12 of the emblem 10 or border 40. Despite including the opaque base layer 70, light can still be emitted from both the back 12 and the front 11 of the emblem 10 or grill border 40 in FIG. 8, since the emblem 10 or grill border 40 includes both the back electroluminescent assembly 90 at the second side 72 of the base layer 70, and the front electroluminescent assembly 100 at the first side 71 of the base layer 70. As such, light emitted by the back electroluminescent assembly 90 is emitted from the back 12 of the emblem 10 or grill border 40, and light emitted by the front electroluminescent assembly 100 is emitted from the front 11 of the emblem 10 or grill border 40. Light emitted by the back electroluminescent assembly 90 may have a different color than light emitted by the front electroluminescent assembly 100. Therefore, light emitted from the front 11 of the emblem 10 or grill border 40 may have different chromaticity coordinates than light emitted from the back 12 of the emblem 10 or grill border 40.

The transparent cover layer 80 is disposed over the first side 71 of the base layer 70, and may define the front 11 of the emblem 10 or grill border 40. When the electroluminescent light source 60 is not activated to emit light, the cover layer 80 is configured such that the cover layer 80 may present a visible surface that has an opaque appearance, such as having a chrome or silver appearance for example. However, when the electroluminescent light source 60 is activated to emit light, the cover layer is configured such that light emitted by the electroluminescent light source (e.g. emitted by the back electroluminescent assembly 90 in FIG. 7, or emitted by the front electroluminescent assembly 100 in FIG. 8) is transmitted through the cover layer 80 and emitted from the front 11 of the vehicle emblem 10, and the cover layer 80 may present a visible surface that has an illuminated appearance that is different than the opaque appearance.

Light emitted by the electroluminescent light source 60 (whether the electroluminescent light source 60 includes only a back electroluminescent assembly 90 or both a back and front electroluminescent assemblies 90, 100) is also emitted from the back 12 of the vehicle emblem 10 or grill border 40. Light emitted from the back 12 of the vehicle emblem 10 or grill border 40 may provide one or both of back lighting to the emblem 10 or grill border 40 and illumination to a vehicle component that is adjacent to the vehicle emblem 10 or grill border 40, such as a portion of the grill assembly 30 or a portion of the steering wheel assembly 8, for example.

Light emitted from the back 12 of the vehicle emblem 10 or grill border 40 may be of a different color (i.e. have different chromaticity coordinates) than light emitted from the front 11 of the vehicle emblem 10 or grill border 40. In FIG. 7 for example, light emitted towards to the front 11 and back 12 of the emblem 10 or grill border 40 by the back electroluminescent assembly may be the same color. However, light emitted towards the front 11 of the emblem 10 or grill border 40 may pass through the transparent base layer 70, through the color modifying layer 110, which changes the color of the light. Light emitted from the front 11 of the emblem 10 or grill border 40 may therefore have different chromaticity coordinates than light emitted from the back 12 of the emblem 10 or grill border 40.

For this purpose, the color modifying layer 110, or portions thereof, may include a color converting additive, such as a photoluminescent pigment, that allows the color modifying layer 110, or portion thereof, containing the color converting additive, to function as a photoluminescent color conversion layer. In a non-limiting example, the color converting additive is cerium doped YAG and the back electroluminescent assembly 90 provides a blue light source that excites the cerium doped YAG to convert a portion of the blue light to yellow light to provide a white light from the front 11 of the emblem 10 or grill border 40, while the blue light is emitted from the back 12 of the emblem 10 or grill border 40. It is to be understood that light can be emitted in different colors, and other color converting additives for the color modifying layer 110 may be used to provide any desired combination of colors of light emitted from the front 11 of the emblem 10 or grill border 40. Alternatively, the color converting additives can be included in the one or more layers of the back electroluminescent assembly 90 itself, such that color converting additives in a color modifying layer 110 are not necessary for emitting light of different colors.

In an alternate embodiment, the emblem 10 in FIG. 7 may not include the color modifying layer 110, and therefore light emitted from the front 11 of the emblem 10 or grill border 40 may have the same chromaticity coordinates than light emitted from the back 12 of the emblem 10 or grill border 40.

In FIG. 8, the back and front electroluminescent assemblies 90, 100 may each emit light that has different or the same chromaticity coordinates as light emitted from the other of the back and front electroluminescent assemblies 90, 100 as desired. Accordingly, light emitted from the front 11 of the emblem 10 or grill border 40 may or may not have different chromaticity coordinates as light emitted from the back 12 of the emblem 10 or grill border 40.

The color of light emitted from the front 11 and back 12 of the grill border 40 may be the same or different from the color of light emitted from the front 11 and back 12 of the emblem 10. As such, the electroluminescent light source 60 of the grill border 40 may have a different phosphor material or color conversion additive than the emblem 10.

Figure 9:
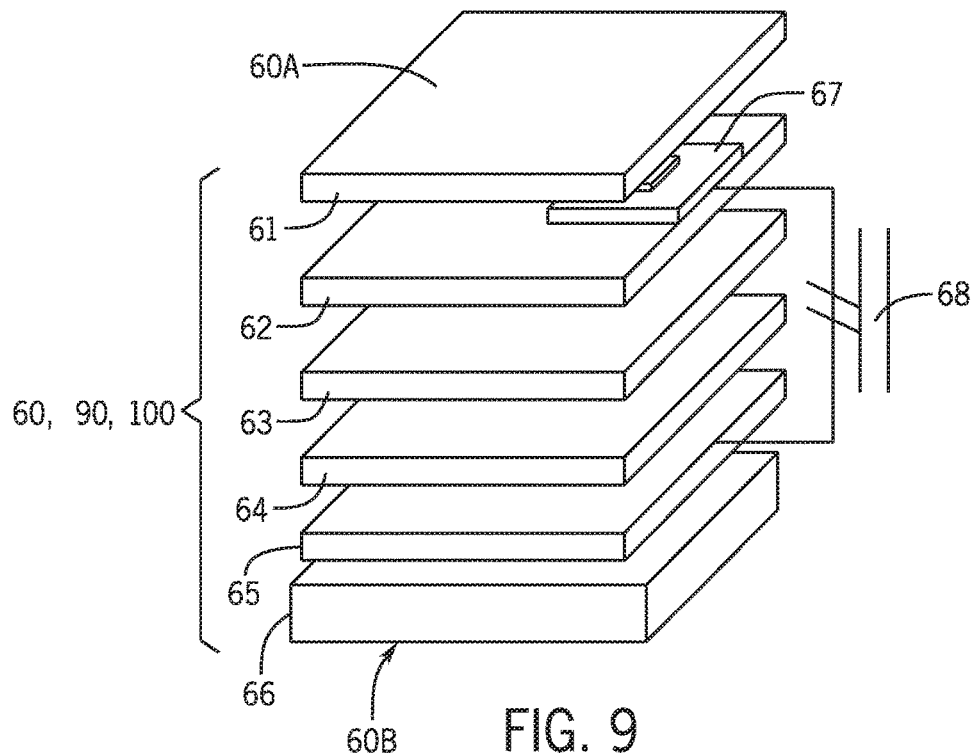
FIG. 9 is a schematic partial exploded view of a portion of an electroluminescent assembly according to an exemplary embodiment.

With additional reference to FIG. 9, the electroluminescent light source 60 (including one or both of the back and front electroluminescent assemblies 90, 100) emits light when activated, which is accomplished by supplying power to the electroluminescent light source 60. The electroluminescent light source 60 comprises a thin flexible sheet-like structure having two major surfaces (i.e. top surface 60A and bottom surface 60B) that are oppositely directed from one another. Although the present subject matter is described in terms of an electroluminescent light source emitting light, it will be understood that the illumination mechanism is not limited in any way. Illustrative examples include a light emitting diode and an organic light-emitting diode configured in a film or sheet that is positionable on the base layer 70.

In several embodiments, such as in FIG. 7, the electroluminescent light source 60 (i.e. back electroluminescent assembly 90) provides "two-way" illumination, wherein both of the top surface 60A and the bottom surface 60B of the electroluminescent light source 60 are light emitting surfaces. In other embodiments, such as in FIG. 8, the electroluminescent light source 60 (i.e. back and front electroluminescent assemblies 90, 100) provides "one-way" illumination, wherein only one of the two major surfaces (e.g. top surface 60A) of the electroluminescent light source 60 is a light emitting surface, while the other of the two major surfaces (e.g. bottom surface 60B) is not a light emitting surface.

In a non-limiting example, the electroluminescent light source 60 may be in the form of electroluminescent lamps disclosed in U.S. Pat. No. 8,470,388, the contents of which is incorporated by reference herein. With reference to FIG. 5, an exemplary schematic stacking arrangement for an electroluminescent assembly is illustrated. As depicted, one or more top layers 61 can be provided as a transparent top coat that presents the top surface 60A. The one or more top layers 61 provide protection to the electroluminescent light source 60, and can have a total thickness of 25 microns to 125 microns. When the electroluminescent light source 60 is not activated and does not emit light, the top layer(s) 61 may provide an opaque appearance of a conventional, non-light-emitting emblem. That is, when the electroluminescent light source 60 is not activated, the top layer 61 is not backlit by an underlying phosphor layer 63, and therefore the top layer 61 may appear to have for example, a chrome or silver, or otherwise opaque appearance or finish.

An electrically conductive top electrode 62 is provided under the one or more top layers 61. The top electrode 62 is a film coating layer that is preferably both electrically conductive and generally transparent to light. Top electrode 62 may comprise such materials as, without limitation, conductive polymers (PEDOT), carbon nanotubes (CNT), antimony tin oxide (ATO) and indium tin oxide (ITO). An illustrative commercial product is CLEVIOS™ conductive, transparent and flexible polymers (available from Heraeus Clevios GmbH of Leverkusen, Germany) diluted in isopropyl alcohol as a thinner/drying agent. CLEVIOS™ conductive polymers exhibit relatively high efficacy. In addition, CLEVIOS™ conductive polymers are based on a styrene co-polymer and thus provides a ready mechanism for chemical crosslinking/mechanical bonding with the underlying phosphor layer 63. In a non-limiting example, the top electrode 62 has a thickness of 1 to 25 microns.

A bus bar 67 is interposed between the top layer 61 and the top electrode 62. The bus bar 67 may be provided as a relatively low-impedance strip of conductive material, usually comprised of one or more of the materials usable to produce the bottom or rear electrode 65. In an illustrative example, the bus bar 67 is comprised of silver. The bus bar 67 is typically applied to the peripheral edge of the lit field. Although bus bar 67 is generally depicted as being on top of the top electrode 62 in the figures, the bus bar 67 may be applied adjacent to the top electrode 62, or below the top electrode 62.

Below the top electrode 62, a phosphor layer 63 is provided. Phosphor layer 63 is a semi-conductive film coating layer comprised of a material (such as metal-doped Zinc Sulfide (ZnS)) encapsulated within an electrostatically permeable polymer matrix. When excited by the presence of an alternating electrostatic field generated by an AC signal, the doped ZnS absorbs energy from the field, which it in turn re-emits as a visible-light photon upon returning to its ground state. In a non-limiting example, the phosphor layer 63 comprises about a 2:1 solution of co-polymer and dilute ammonium hydroxide. To this solution, a quantity of metal-doped ZnS based phosphors doped with at least one of copper, manganese and silver (i.e., ZnS:Cu, Mn, Ag, etc.) pre-wetted in a dilute ammonium hydroxide is added to form a supersaturated suspension. In a non-limiting example, the phosphor layer 63 comprises a thickness of 30 to 100 microns.

Below the phosphor layer 63, a dielectric layer 64 is provided that electrically insulates the phosphor layer 63. Dielectric layer 64 may be an electrically non-conductive film coating layer comprising a material (typically Barium Titanate—$BaTiO_3$) possessing high dielectric constant properties encapsulated within an insulating polymer matrix having relatively high permittivity characteristics (i.e., an index of a given material's ability to transmit an electromagnetic field). In an illustrative example, the dielectric layer 64 comprises about a 2:1 solution of co-polymer and dilute ammonium hydroxide. To this solution a quantity of $BaTiO_3$, which has been pre-wetted in ammonium hydroxide, may be added to form a supersaturated suspension. In embodiments providing two-way illumination, the dielectric layer 64 is transparent. In a non-limiting example, the dielectric layer 64 may comprise at least one of a titanate, an oxide, a niobate, an aluminate, a tantalate, and a zirconate material, among others.

Below the dielectric layer 64, a rear electrode layer 65 is provided that is electrically connected to the conductive lead 68, which is connected to a power source of the vehicle 1 to thereby provide power to the electroluminescent assemblies for illumination thereof. The conductive lead 68 may comprise any of the materials that may be used for the top electrode 62 or the rear electrode 65. The rear electrode layer 65 is a film coating layer that may be a sprayable conductive material and may form the rough outline of the lit EL "field". In a non-limiting example such as in embodiments providing one-way illumination, the rear electrode 65 may be made using a highly conductive, generally opaque material. Examples of such materials include, without limitation, an alcohol/latex-based, silver-laden solution such as SIL-VASPRAY™ available from Caswell, Inc. of Lyons New York, and a water-based latex, copper-laden solution such as "Caswell Copper" copper conductive paint, also available from Caswell, Inc., and mixtures thereof.

In a non-limiting example, the rear electrode 65 may be a metal plating wherein a suitable conductive metal material is applied to a non-conductive substrate 66 (which is optionally transparent) using any suitable process for the select metal plating. Example types of metal plating include, without limitation, electroless plating, vacuum metalizing, vapor deposition and sputtering. In one embodiment, the rear electrode 65 is provided on a substrate 66, with subsequent layers being formed thereon to provide an electroluminescent light source 60.

In other embodiments where two-way illumination is provided, the rear electrode 65 may comprise transparent materials. The rear electrode 65 may be made from an electrically conductive, generally clear transparent layer such as, without limitation, "CLEVIOS™ S V3" and or "CLEVIOS™ S V4" conductive polymers, available from Heraeus Clevios GmbH of Leverkusen, Germany. This transparent configuration for the rear electrode allows for two-way illumination.

Finally, a primer layer (not shown) may be positioned between the rear electrode 65 and the substrate 66. The primer layer may be oxide-based and may serve to electrically insulate the subsequent conductive and semi-conductive layers from the substrate/transparent panel, and/or may also promote adhesion between substrate 66 and subsequently applied layers. In a non-limiting example, the primer layer may be a transparent layer, such as a transparent polymeric material. Illustrative examples include polyurethane coatings such as single or two-component polyurethane systems.

Additionally, the conductive lead 68 can be electrically connected to a power source of the vehicle 1, to thereby electrically connect the electroluminescent light source 60 to the power source. During operation, a voltage supply to the conductive lead 68 can be varied to change a brightness of the electroluminescent light source 60. Also, a frequency of the power supplied to the conductive lead 68 can be varied to change a color of the electroluminescent light source 60.

The electroluminescent light source 60 can be included in a variety of shapes, sizes, configurations, and at a plurality of locations within or on the emblem 10. In accordance with the present disclosure, the emblem 10 can include additional electroluminescent light sources as desired. Because back and front electroluminescent assemblies 90, 100 are flexible, they can be conformed to the contours and shape of the base layer 70, which may include complex curves to form a distinctive emblem 10 or grill border 40.

The electroluminescent light source 60 may be activated to emit light jointly or separately from the front 11 and back 12 of the emblem 10 or grill border 40. Activation of the electroluminescent light source 60 may be paired to certain operations of the vehicle. For example with reference to FIGS. 1 and 2, the electroluminescent light source 60 may be paired to operation of a vehicle turn signal, such that light is emitted from the back 12 of the emblem 10 or grill border 40 to illuminate either a driver's side (e.g. front left) of the grill panel 20 or a passenger's side (e.g. front right) of the grill panel 20, in order to indicate a vehicle operator's intended direction of turning the vehicle 1. For this purpose, there may be multiple electroluminescent light sources that are separately activatable, or a single electroluminescent light source that includes separate dielectric and electrode layers, a common phosphor layer and a common top layer. The separate dielectric and electrode layers may be electrically isolated by gaps filled with a non-conductive material, such as a non-conductive polymer. In this configuration, various regions of the electroluminescent light source can be separately activated to thereby emit light from different portions (e.g. right side or left side) of the electroluminescent light source. The electroluminescent light source 60 may be paired to other vehicle operations for activation, including when an engine of the vehicle is running, or during powered movement of the vehicle, for example. For this purpose, the emblem 10 or grill border 40 may include a plurality of distinct electroluminescent light sources 60, such as is shown in FIG. 8 including a back and front electroluminescent assembly 90, 100.

Figure 10:
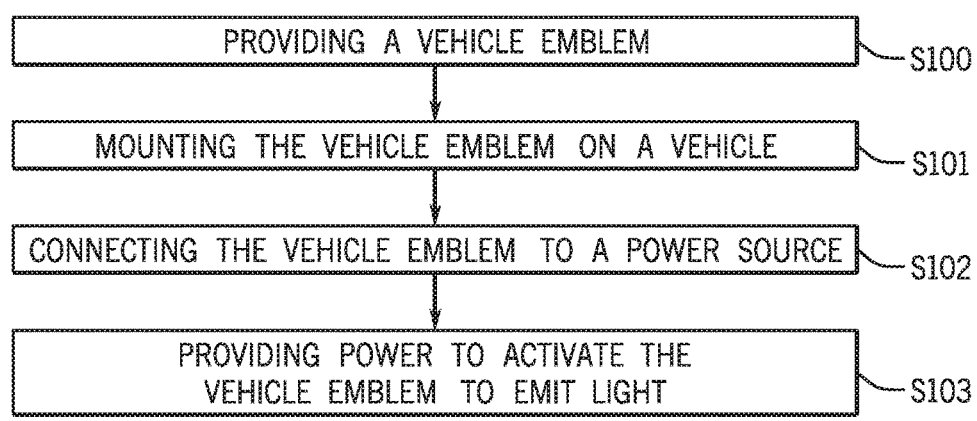
FIG. 10 is a schematic block diagram illustrating an exemplary method of illuminating a vehicle emblem.

With reference to FIG. 10, a schematic block diagram illustrating a method of illuminating a vehicle emblem will now be discussed. The method will be described in association with the grill assembly 30 and steering wheel assembly 8 discussed herein (shown in FIGS. 1-8), though this is not required and the method can be used with other vehicle assemblies.

In the method, at S100, a vehicle emblem 10 is provided. The vehicle emblem 10 can have a base layer 70 having a first side 71 and a second side 72 that is opposite from the first side 71. A cover layer 80 is disposed over the first side 71 of the base layer 70. An electroluminescent light source 60 that emits light when activated is included in the emblem 10. The electroluminescent light source 60 is disposed on the base layer 70.

At S101, the vehicle emblem 10 is mounted on a vehicle 1. It will be appreciated that the emblem 10 may be mounted as part of a grill assembly 30, a steering wheel assembly 8, or as part of a different vehicle assembly as desired. At S102, the vehicle emblem 10 is connected to a power source of the vehicle 1. At S103, power from the power source is provided to the vehicle emblem 10 to activate the vehicle emblem 10 to emit light.

When the electroluminescent light source is not activated, the cover layer 80 has an opaque appearance. When the electroluminescent light source is activated, light emitted from the electroluminescent light source is a) transmitted through the cover layer 80 and emitted from a front 11 of the vehicle emblem 10, and b) emitted from a back 12 of the vehicle emblem 10 that is opposite from the front 11 of the vehicle emblem 10. Light emitted from the front 11 of the vehicle emblem 10 has different chromaticity coordinates than light emitted from the back 12 of the vehicle emblem 10.

The vehicle emblem 10 may be mounted on a grill panel 20 of the vehicle 1 or as part of a grill assembly 30, and light emitted from the back 12 of the vehicle emblem 10 may illuminate at least a portion of a front surface 22 of the grill panel 20. The vehicle emblem 10 may also mounted in an interior (e.g. passenger's compartment 6) of the vehicle 1, and light emitted from the back 12 of the vehicle emblem 10 may illuminate and interior vehicle component (e.g. steering wheel assembly 8) adjacent to the vehicle emblem 10.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle emblem comprising:
   a base layer having a first side and a second side that is opposite from the first side,
   a cover layer disposed over the first side of the base layer, and
   an electroluminescent light source that emits light when activated,
   wherein when the electroluminescent light source is not activated, the cover layer has an opaque appearance, and
   wherein when the electroluminescent light source is activated, light emitted from the electroluminescent light source is a) transmitted through the cover layer and emitted from a front of the vehicle emblem, and b) emitted from a back of the vehicle emblem that is opposite from the front of the vehicle emblem.

2. The vehicle emblem of claim 1, wherein light emitted from the front of the vehicle emblem has different chromaticity coordinates than light emitted from the back of the vehicle emblem.

3. The vehicle emblem of claim 2, wherein light emitted from the back of the vehicle emblem illuminates a vehicle component adjacent to the vehicle emblem.

4. The vehicle emblem of claim 3, wherein the electroluminescent light source includes a back electroluminescent assembly disposed at the second side of the base layer.

5. The vehicle emblem of claim 4, wherein:
   the back electroluminescent assembly is configured such that when activated, the back electroluminescent assembly emits light towards the back of the vehicle emblem and towards the front of the vehicle emblem, and the base layer is transparent such that light emitted by the back electroluminescent assembly toward the front of the vehicle emblem is transmitted through the base layer and through the cover layer, and is emitted from the front of the vehicle emblem.

6. The vehicle emblem of claim 5, wherein the cover layer includes a color converting additive that changes the chromaticity coordinates of light emitted by the back electroluminescent assembly and transmitted through the cover layer.

7. The vehicle emblem of claim 4, wherein
the electroluminescent light source further includes a front electroluminescent assembly that emits light when activated, and is disposed at the first side of the base layer,
the front electroluminescent assembly is configured such that when activated, the front electroluminescent assembly emits light towards the front of the vehicle emblem, and
the back electroluminescent assembly is configured such that when activated, the back electroluminescent assembly emits light towards the back of the vehicle emblem.

8. The vehicle emblem of claim 7, wherein the front electroluminescent assembly and the back electroluminescent assembly are configured such that they can be separately activated to emit light.

9. The vehicle emblem of claim 3, wherein the back electroluminescent assembly is configured such that operation of an associated vehicle turn signal activates the back electroluminescent assembly.

10. A grill assembly of a vehicle comprising a grill panel, and an electroluminescent emblem that emits light when activated, wherein:
the emblem includes a front and an oppositely directed back,
the emblem is secured relative to the grill panel such that the back of the emblem is closer to the grill panel than the front of the emblem,
when the emblem is not activated, the front of the emblem has an opaque appearance,
upon activation, light is emitted from the front and back of the emblem, and
light emitted from the back of the emblem illuminates at least a portion of a front surface of the grill panel.

11. The grill assembly of claim 10, wherein light emitted from the front of the emblem has different chromaticity coordinates than light emitted from the back of the emblem.

12. The grill assembly of claim 10, wherein the emblem is spaced in front of the grill panel by one or more legs.

13. The grill assembly of claim 12, wherein light emitted from the back of the emblem is redirected so as to propagate in a direction along the front surface of the grill panel.

14. The grill assembly of claim 13, wherein the emblem is configured such that operation of an associated vehicle turn signal activates the emblem to illuminate a corresponding front right surface or front left surface of the grill panel.

15. The grill assembly of claim 10, wherein:
the opaque appearance is a chrome appearance, and
upon activation of the emblem to emit light, the front has an illuminated appearance that is different from the chrome appearance.

16. The grill assembly of claim 10, further including an electroluminescent border that emits light when activated, and is disposed around a periphery of the grill panel, wherein:
the border includes a front and an oppositely directed back,
the border is secured relative to the grill panel such that the back of the border is closer to the grill panel than the front of the border,
when the border is not activated, the front of the border has a chrome appearance,
upon activation, light is emitted from the front and back of the border such that the front of the border has an illuminated appearance different from the chrome appearance, and
light emitted from the back of the border illuminates at least a portion of the front surface of the grill panel.

17. The grill assembly of claim 10, wherein:
the grill panel includes three-dimensional projections protruding from the front surface of the grill panel, and
upon activation of the emblem, light emitted from the back of the emblem illuminates the projections.

18. A method of illuminating a vehicle emblem, comprising:
providing a vehicle emblem including,
a base layer having a first side and a second side that is opposite from the first side,
a cover layer disposed over the first side of the base layer, and
an electroluminescent light source that emits light when activated, the electroluminescent light source being disposed on the base layer,
mounting the vehicle emblem on a vehicle,
attaching the vehicle emblem to a power source of the vehicle, and
providing power from the power source to the vehicle emblem to activate the vehicle emblem to emit light,
wherein when the electroluminescent light source is not activated, the cover layer has an opaque appearance, and
wherein when the electroluminescent light source is activated, light emitted from the electroluminescent light source is a) transmitted through the cover layer and emitted from a front of the vehicle emblem, and b) emitted from a back of the vehicle emblem that is opposite from the front of the vehicle emblem, and
wherein light emitted from the front of the vehicle emblem has different chromaticity coordinates than light emitted from the back of the vehicle emblem.

19. The method of claim 18, wherein the vehicle emblem is mounted on a grill panel of the vehicle, and light emitted from the back of the vehicle emblem illuminates at least a portion of a front surface of the grill panel.

20. The method of claim 18, wherein the vehicle emblem is mounted in an interior of the vehicle, and light emitted from the back of the vehicle emblem illuminates and interior vehicle component adjacent to the vehicle emblem.

* * * * *